(12) United States Patent
Warsop et al.

(10) Patent No.: US 6,607,162 B2
(45) Date of Patent: Aug. 19, 2003

(54) RING-WING AIRCRAFT

(75) Inventors: Clyde Warsop, Gloucestershire (GB); Mike Woods, Bath (GB); James Henderson, Gloucestershire (GB); Gary Lock, Bath (GB)

(73) Assignee: BAE Systems plc, Hampshire (GB)

( * ) Notice: Subject to any disclaimer, the term of this patent is extended or adjusted under 35 U.S.C. 154(b) by 0 days.

(21) Appl. No.: 10/049,044

(22) PCT Filed: Apr. 20, 2001

(86) PCT No.: PCT/GB01/01769

§ 371 (c)(1),
(2), (4) Date: Feb. 7, 2002

(87) PCT Pub. No.: WO01/96179

PCT Pub. Date: Dec. 20, 2001

(65) Prior Publication Data

US 2002/0104923 A1 Aug. 8, 2002

(30) Foreign Application Priority Data

Jun. 10, 2000 (GB) .............................. 0014064

(51) Int. Cl.$^7$ ............................ B64C 39/06; B64C 3/10
(52) U.S. Cl. .................................... 244/12.6; 244/34 A
(58) Field of Search ...................... 244/12.6, 21, 23 C, 244/34 A, 36

(56) References Cited

U.S. PATENT DOCUMENTS

| | | | | |
|---|---|---|---|---|
| 3,017,139 A | * | 1/1962 | Binder | 244/12.6 |
| 3,903,639 A | | 9/1975 | Howell | |
| 3,987,981 A | * | 10/1976 | Kook | 244/34 A |
| 4,804,155 A | | 2/1989 | Strumbos | 244/12.6 |
| 5,295,643 A | | 3/1994 | Ebbert et al. | 244/7 |
| 5,758,844 A | | 6/1998 | Cummings | 244/7 |

FOREIGN PATENT DOCUMENTS

| | | | | |
|---|---|---|---|---|
| FR | 528041 | | 10/1920 | |
| GB | 754344 | * | 2/1956 | 244/34.1 |
| GB | 832542 | | 3/1957 | |
| GB | 865524 | | 5/1957 | |
| GB | 900095 | | 10/1958 | |

OTHER PUBLICATIONS

XP-000749273 (Popular Science) by: Jerome Greer Chandler; pp. 54–59 (Jan. 1998).
International Search Report.
British Search Report.

* cited by examiner

Primary Examiner—Robert P. Swiatek
(74) Attorney, Agent, or Firm—Crowell & Moring LLP

(57) ABSTRACT

A ring-wing aircraft suited particularly, although not exclusively, to use in micro-unmanned air vehicles (UAV's) with ring-wings. An aircraft (10) according to the invention comprises a ring-wing (11) defining a duct (16) with a longitudinally-extending central axis (31), propulsion element (15) located within the duct and moveable aerofoils (13, 18) for controlling the aircraft in flight, the ring-wing being truncated obliquely at one end, that end being the rear (11b) when in horizontal flight, to form a ring-wing with opposed sides of unequal length. This arrangement produces center of mass offset from the central axis of the ring-wing, the pendulum effect will ensure that the aircraft will roll so that its center of mass will always be at the lowest height possible when the aircraft is airborne. Therefore the aircraft has a preferred orientation, and the control surfaces can be oriented with respect to this preferred orientation. In addition, the oblique truncation at the rear keeps the center of mass towards the front of the aircraft thereby giving improved stability in all three axes.

11 Claims, 3 Drawing Sheets

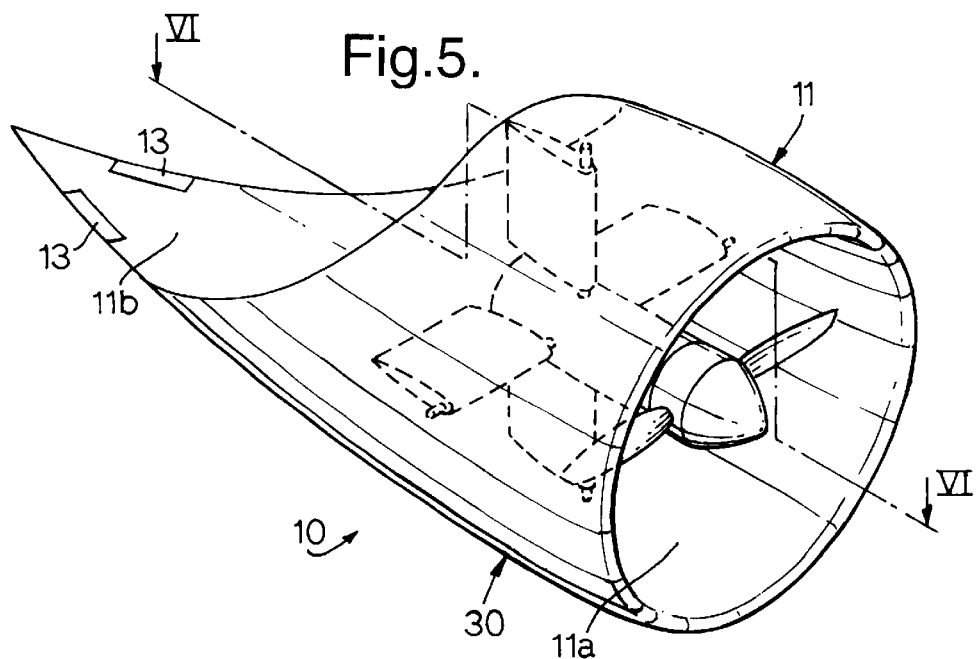
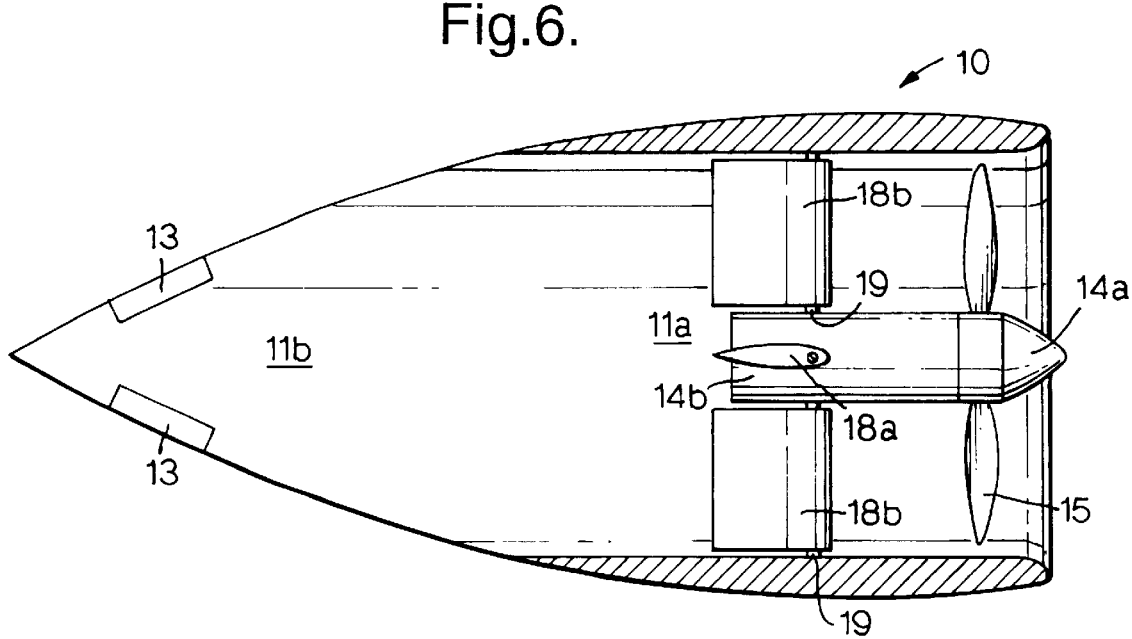

RING-WING AIRCRAFT

BACKGROUND AND SUMMARY OF THE INVENTION

This application claims the priority of British patent document 0014064.0, filed Jun. 10, 2000 (PCT International Application No. PCT/GB01/01769), the disclosure of which is expressly incorporated by reference herein.

This invention relates to ring-wing aircraft and is suited particularly, although not exclusively, to use in micro-unmanned air vehicles (UAV's) incorporating ring-wings. However, it will be appreciated that the invention is equally well suited to use in ring-wing aircraft of any size, whether they be manned or unmanned.

Unmanned air vehicles have found a number of applications, where they have been used to carry a wide variety of payloads. In the absence of a pilot, the aircraft may be scaled down, typically to a size of 150 mm or less. The reduction in size and the absence of extra load in the form of a pilot fit in well with the constant drive to produce lighter aircraft because of their inherent efficiency advantages.

In terms of flexibility it is advantageous for UAV's to be able both to hover and to fly horizontally at high speed. This criterion has led to the development of ring-wing aircraft, i.e. an aircraft having a propeller or other propulsion system mounted within a duct defined by a ring-shaped wing of substantially circular cross-section. A ring-wing aircraft is disclosed in U.S. Pat. No. 5,295,643 to Hughes Missile Systems Company, although the scale of the aircraft is not disclosed. The Hughes aircraft has a 'toroidal' ring-wing that defines a duct (although the ring-wing is generally flat in cross-section so that it can be considered as essentially an annular cylinder). A propeller, stators and vanes are located within the duct. In the Hughes aircraft, the stators serve to straighten the swirling air produced by the rotating propeller and hence help to balance the torque applied to the aircraft by the rotating propeller. The vanes are used as control surfaces for controlling the pitch and yaw of the aircraft when airborne.

The use of a ring-wing has benefits that include reducing the noise signature of the propeller and providing a protective housing for the propeller that guards against both damage to the propeller and damage to anything or anyone that may otherwise come into contact with the propeller. However, the main advantage of the ring-wing design is that it can be used both for hovering, by orienting the propeller horizontally, and for horizontal flight by orienting the propeller vertically. In the Hughes aircraft, the transition from vertical to horizontal flight is effected by use of the vanes.

However, the Hughes Patent does not discuss any aspects of roll pertinent to their aircraft, nor does it contain any detailed discussion on any aspects of yaw or pitch. Clearly these are important aspects on the design of a ring-wing UAV as these aircraft must be controlled either autonomously or by remote control, and so control and stability of the aircraft must be enhanced, say, over a manned vehicle where the pilot will have direct feedback from his sense of balance as to the attitude of the aircraft. Where autopilots are used, natural stability of the UAV is highly important as it reduces the complexity, size and, critically, the mass of the autopilot system to be installed on the aircraft.

Natural stability in the pitch and yaw planes is achieved by placing the centre of mass of the aircraft ahead of the aerodynamic neutral points in the pitch and yaw planes. The shape of the ring-wing means that the aerodynamic pressures acting on all portions of the ring-wing have a line of action that inherently passes through the centre of the ring. The symmetry of the continuous ring-wing ensures that these pressures give rise to no contribution to rolling moment. It will be appreciated that the ring-wing need not be continuous: the ring may be divided into two or more sections and there will still be no rolling moment contribution from the aerodynamic pressures.

However, the inherent neutral symmetry of ring-wing aircraft can be considered problematic. This is because any disturbance about the roll axis leaves the aircraft in an attitude without any incremental aerodynamic rolling moment to restore it to its undisturbed condition—there is no tendency for the aircraft to right any induced roll. This tendency freely to roll can lead to a requirement for a flight control system to provide a means of controlling the vehicle, thereby adding complexity, and quite often mass, to the aircraft.

An object of the invention is to overcome the disadvantages of previous designs of ring-wing UAV's described hereinabove.

From a first aspect, the present invention resides in an aircraft comprising a ring-wing defining a duct with a longitudinally extending central axis, propulsion means located within the duct and moveable aerofoils for controlling the aircraft in flight, the ring-wing being truncated obliquely at one end, that end being the rear when in horizontal flight, to form a ring-wing with opposed sides of unequal length.

It should be noted that the term ring-wing is intended to encompass rings of substantially circular cross-section, both continuous and interrupted, i.e. where segments of the ring have been omitted. This is best done to leave a wing symmetrical about its central axis.

It will be appreciated that by truncating the ring-wing obliquely at its rear produces and aircraft with a centre of mass offset from the central axis of the ring-wing. The pendulum effect will ensure that the centre of mass will always be at the lowest height possible when the aircraft is airborne. Hence, should the aircraft roll, the rolling moment due to the increased height of the centre of mass will produce a rolling motion of the aircraft so that the centre of mass returns to the lowest height possible. It will be appreciated that the further the centre of mass is offset from the central axis of the ring-wing, the greater the tendency for the aircraft to roll to correct any disturbance about its roll axis. Therefore the aircraft has a preferred orientation, and the control surfaces can be oriented with respect to this preferred orientation. Roll stability is thus achieved through the restoring moments provided by the offset centre of gravity rather than through aerodynamic restoring moments.

In addition, truncating the ring-wing at its rear rather that its front is advantageous as it produces a centre of mass ahead of the aerodynamic neutral points in the pitch and yaw planes when the aircraft is engaged in high-speed forward flight. It should be appreciated that the applicant has realised that a simple modification of the basic ring-wing shape is highly beneficial because in addition to offsetting the centre of mass from the central axis of the ring-wing to provide self-righting roll control, it also moves the centre of mass towards the front of the aircraft, i.e. the simple modification provides much improved stability in all three axes.

Optionally, the ring-wing is truncated by a planar slice through the ring-wing. It is preferred that the planar slice makes an angle of between 25° and 65° to the longitudinally extending central axis. It is further preferred for the angle to be between 25° and 45° and yet further preferred for the angle to be substantially equal to 45°. Optionally, the ring-wing is truncated by a curved slice, the angle made with the ring-wing being relatively shallow at the longer side of the ring-wing and relatively steep at the shorter side of the ring-wing. This arrangement conveniently produces a greater shift in the centre of mass to the shallow end.

The payload and other components of the aircraft that do not need to be located on the central axis of the ring-wing (e.g. remove control receiver, batteries or fuel tank, motor speed controller, etc.) constitute the substantial majority of the overall mass of the aircraft and, thus, should be located offset from the central axis of the ring-wing. In order to maximise the pendulum effect, it is advantageous to house components and/or any payload in a compartment that is external to the longer side of the ring-wing. Alternatively, or in addition, components and/or any payload may be housed in a compartment provided within the longer side of the ring-wing. Advantageously, the compartment may be provided at one end of the ring-wing, that end being the front when in horizontal flight, as this configuration assists stability in all three axes.

The aircraft may have a pitch-controlling aerofoil component provided offset from the central axis of the ring-wing. Optionally, it may be positioned to reside substantially flat with the longer side of the ring-wing when not deployed. Advantageously, it may be provided as an element of the longer side of the ring-wing.

Conveniently, the aircraft may further comprise two orthogonal vanes wherein one vane provides aerodynamic lift in the same direction as the pitch-controlling aerofoil. These vanes may primarily control the roll and yaw attitude of the aircraft, and they may operate in conjunction with the pitch-controlling aerofoil in certain manoeuvres, to effect a turn for example.

Optionally, any aircraft defined hereinabove is unmanned. The diameter of the ring-wing may be less than 50 cm, although a diameter of less than 25 cm is currently preferred.

Other objects, advantages and novel features of the present invention will become apparent from the following detailed description of the invention when considered in conjunction with the accompanying drawings.

BRIEF DESCRIPTION OF THE DRAWINGS

FIG. 5 is a perspective view of an aircraft according to a second embodiment of the present invention; and FIG. 6 is a section along line VI—VI of FIG. 5.

DETAILED DESCRIPTION OF THE DRAWINGS

Figure 1:
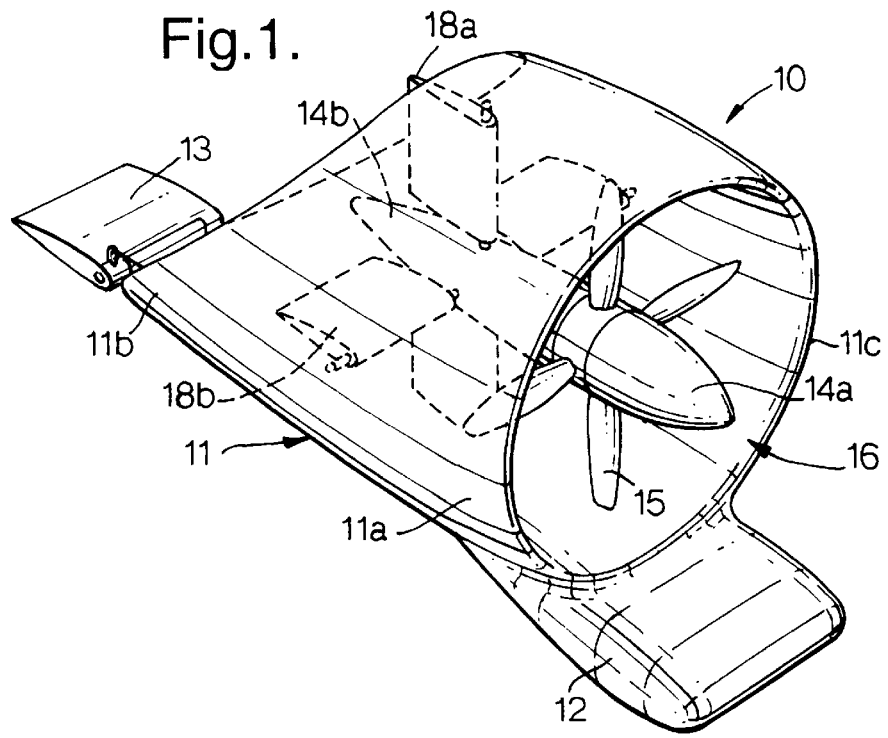
FIG. 1 is a perspective view of an aircraft according to a first embodiment of the present invention.
Figure 2:
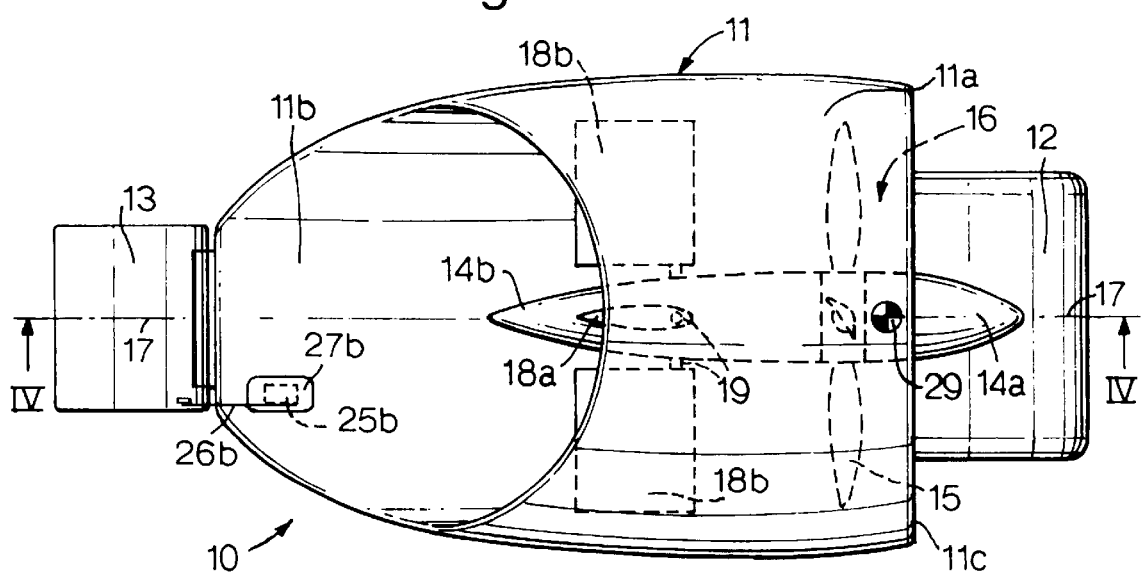
FIG. 2 is a plan view of the aircraft of FIG. 1.
Figure 3:
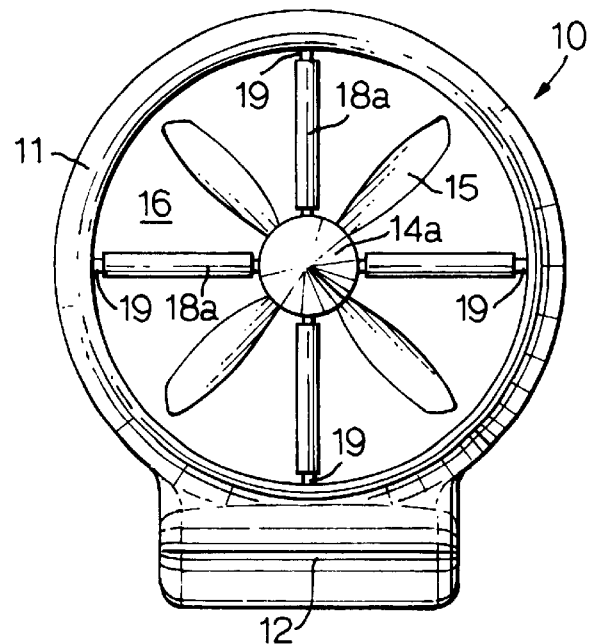
FIG. 3 is a front view of the aircraft of FIG. 1.

As can be seen from FIGS. 1 to 3, an aircraft 10 according to a first embodiment of the invention comprises a ring-wing 11 with a compartment 12 and a rear elevator 13. The compartment 12 is located below a forward section 11a of the ring-wing 11 so that it extends beyond the front of the ring-wing 11. The size of the aircraft can be gauged from the fact that the ring-wing 11 has a diameter of 12 cm. The ring-wing 11 is obliquely truncated at an angle α of 45° to the ring-wing's longitudinally-extending central axis 31 to define the forward section 11a and a tail section 11b comprising a part ring. The ring-wing 11 is truncated in planar fashion so that the tail section 11b tapers uniformly to meet the elevator 13 at the rear of the aircraft. The centreline of the tail section 11b is coincident with the centreline of the elevator 13.

Turning now to the front of the aircraft, a forward fairing 14a protrudes from the centre of a void 16 defined by the ring-wing 11. The forward fairing 14a is located directly in front of a four-bladed propeller 15 which resides just inside the void 16 and rotates about the longitudinal axis 17 of the ring-wing 11. Behind the propeller 15, a rear fairing 14b extends along the longitudinal axis to terminate above the tail section 11b of the ring-wing 11. Four vanes 18 are located within the void 16 at the rear of the forward section 11a and are arranged symmetrically around the longitudinal axis 17 of the ring-wing 11 as a pair of vertical vanes 18a and a pair of horizontal vanes 18b. The vanes 18 protrude slightly beyond the extent of the top of the forward section 11a of the ring-wing 11, i.e. they overlap slightly with the tail section 11b.

A compartment 12 is located underneath the ring-wing 11 so that it spans the length of the forward section 11a and protrudes forwards of the leading edge 11c of the ring-wing 11. The compartment 12 is profiled to have an aerodynamic shape, i.e. its outer surfaces constitute a further fairing.

A pair of elongate supports 19 span the void 16 at the rear of the forward section 11a of the ring-wing 11, one horizontal and one vertical, and support the fairings 14a, 14b and the vanes 18.

Figure 4:
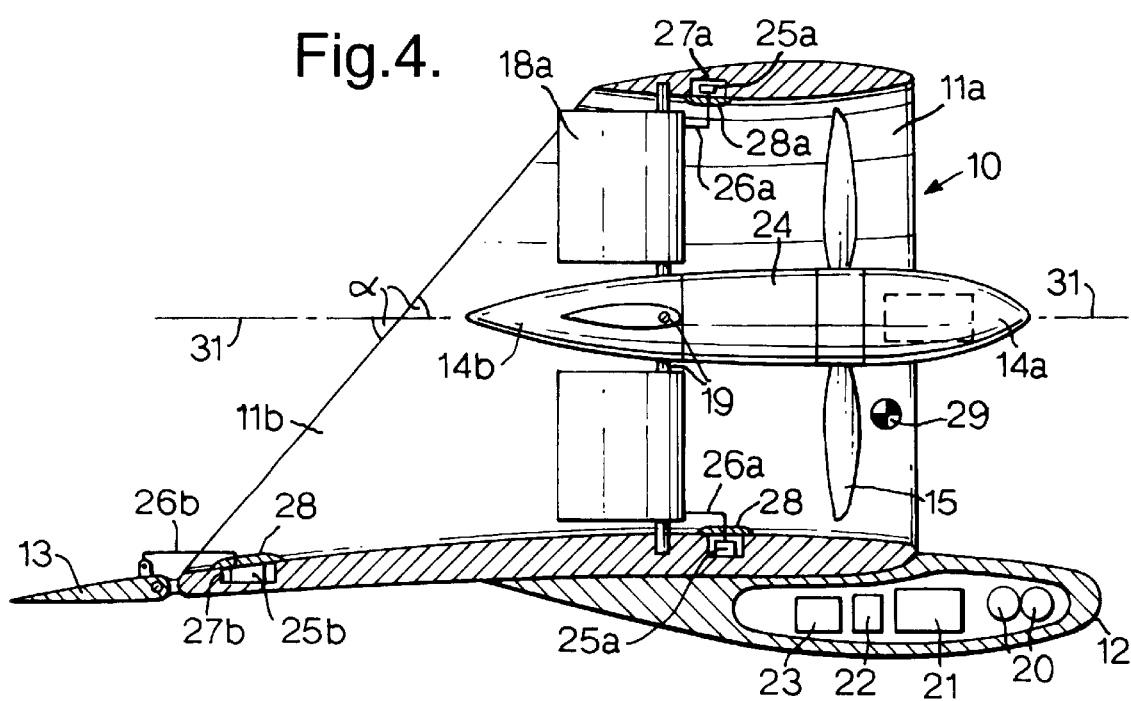
FIG. 4 is a section along line IV—IV of FIG. 2.

FIG. 4 is a vertical section of the aircraft 10 and shows the aircraft in more detail. As can be seen, the compartment 12 is hollow and houses several components of the aircraft 10. Specifically, these are a pair of high-performance batteries 20 to power the plane, a radio receiver 21 to receive the flight control instructions transmitted by a hand-held transmitter used by an operator and an electronic motor speed controller 22. In addition, a payload 23 is also shown. To ensure an optimal aerodynamic profile of the compartment 12, the components 20, 21, 22 and payload 23 are arranged one in front of the other, thereby ensuring that the compartment 12 is shallow and narrow. The aerodynamic profile of the compartment 12 is clearly shown in FIG. 4.

Furthermore, FIG. 4 also shows the ring-wing 11 to have a characteristic cross-sectional profile of aerofoils, thereby maximising the lift generated by the ring-wing 11. The aerodynamic profile of the ring-wing 11 is uniform around its circumference. This typical aerofoil profile is also used for the elevator 13 and for the vanes 18.

The propeller 15 is powered by a motor 24 housed in a cavity provided in the rear fairing 14b behind the propeller 15, the propeller 15 being mounted on a central shaft of the motor 24. The body of the motor 24 forms part of the sides of the rear fairing 14b. Recessing the motor 24 within the rear fairing 14b ensures optimal aerodynamics of the aircraft 10. The supports 19 pass through the rear fairing 14b behind the motor 24 in through-holes sized to ensure a snug fit and terminate snugly within holes provided in the ring-wing 11. The supports 19 are bonded securely within the holes provided in the ring-wing 11.

The vanes 18 are provided with through-holes extending across the width of their forward end, the through-holes being sized to provide a sliding fit within the supports 19 which pass through the through-holes. Accordingly, the vanes 18 pivot about the supports 19 to provide control surfaces during flight. Each vane 18 is moved by an associated servo motor 25a linked to its vane 18 by a crank arm and linkage 26a. The servo motors 25a are housed within recesses 27a of the ring-wing 11 fitted with aerodynamic covers 28. Similarly, the elevator 13 is also deployed by a servo motor 25b linked by a crank arm and linkage 26b, the servo motor 25b being housed within a covered recess 27b of the tail section 11b. All servo motors 25a, 25b draw their power from the batteries 20, as does the propeller motor 24. Wires (not shown) distribute electricity and are routed within recesses or hollows.

The forward fairing 14a is hollow, which is advantageous as the internal space provides room for further payloads or, when not used as a store, reduces the overall mass of the aircraft 10.

This crucial aspect of the overall mass of the aircraft 10 drives the choice of materials of the various components of the aircraft 10. Low density materials are generally preferred. Specifically, styrofoam is used for the ring-wing 11, the compartment 12, the vanes 18, elevator 13 and fairings 14a, 14b. Carbon-fibre composite tubes are used for the supports 19 and also for the crank arms and linkages 26a, 26b in combination with spring-steel wires. Compact, low-mass servo motors 25a, 25b and motor 24 are employed.

The careful choice of materials, component shape and positioning described hereinabove results in a centre of mass 29 of the aircraft 10 that is both below the central axis 17 of the ring-wing 11 and close to the leading edge 11c of the ring-wing 11. Therefore, the aircraft 10 has considerable stability in the pitch and yaw planes and, in addition to stability about its roll axis, it is self-righting about its roll axis.

Aspects relating to the flight of the aircraft 10 will now be described. The aircraft 10 is launched using a conventional model glider technique, namely a long length of elastic material that launches the aircraft 10 into horizontal flight, the propeller 15 already running.

In level horizontal flight, the vanes 18 are not positioned exactly horizontally and vertically, but are slightly offset to account for the torque produced by the rotating propeller 15 which would otherwise produce a tendency for the aircraft 10 to roll. Control of the aircraft 10 in flight is accomplished using the elevator 13 for pitch control and the vanes 18 for roll-control. Yaw control has been found not to be necessary—turns are accomplished by using a combination of pitch and roll control in a conventional manner.

When hovering, the propeller 15 is oriented horizontally with the elevator 13 being lowermost. For this mode the elevator 13 controls pitch and the vanes 18 control both roll and yaw. Rather than being oriented exactly upright, the aircraft 10 is tilted slightly in order to maintain the centre of mass 29 in line with the thrust axis. For fine control of the thrust axis, the propeller 15 may have a conventional helicopter-like pitch/collective mechanism so that the angle of the propeller blades 15 changes as they rotate from the approaching sector to the retreating sector. Alternatively, this fine control could be accomplished by mounting the motor 24 on gimbals thereby allowing the whole axis of rotation of the propeller 15 to be tilted. The aircraft 10 can be moved around at low speed in the hover mode by slight alteration of the tilt of the aircraft 10.

Transition between horizontal flight and hover is accomplished using a conventional pitch-up manoeuvre initiated using the elevator 13 or vanes 18 combined with throttling of the motor 24. Transition from hover to horizontal flight is accomplished in an inverse manner.

When the aircraft 10 rolls for any reason, for example if disturbed by a gust of wind or if rolled during a turning manoeuvre, the rolling moment due to the increase in height gained by the centre of mass 29 will produce a tendency to roll in the opposite sense so that the centre of mass 29 may return to its lowest height. Hence, when disturbed by a gust of wind, the aircraft 10 will correct the induced roll straight away without the need to use the vanes 18 or the elevator 13. In the case of a turning manoeuvre, the aircraft 10 will self-right to its stable in-flight orientation as soon as the vanes 18 and the elevator 13 are no longer deployed.

A second embodiment of the invention is shown in FIGS. 5 and 6. This embodiment broadly corresponds to the first embodiment, and so like reference numerals are used for like parts.

This alternative embodiment differs firstly in the design of the tail section 11b of the ring-wing 11 and the elevator 13. The ring-wing 11 is truncated obliquely along a curve, so that it cuts the top of the ring-wing 11 at a relatively sharp angle and then becomes progressively shallower to meet a 'V'-shaped beaver-tail section 11b. A moveable elevator 13 is recessed into each side of the 'V' and is hinged at its forward edge. These elevators 13 work in tandem to control the pitch of the aircraft 10 or in combination to control the roll of the aircraft 10.

This alternative embodiment also differs in that several of the components of the aircraft 10 are housed in a compartment located within the lower front portion of the ring-wing 11. Although the compartment is not shown explicitly, its position is shown generally by the reference number 30 in FIG. 5.

The person skilled in the art will appreciate that modifications can be made to the embodiments described hereinabove without departing from the scope of the invention.

For example, rather than using the vanes 18 to compensate for the torque produced by the rotating propeller 15, a contra-rotating propeller could be employed. This also has the benefits of increasing the thrust produced, provided the correct optimisation of the propeller blades is undertaken.

As an alternative to using styrofoam for parts of the aircraft 10, they could be made from silica aero-gels which, advantageously, have very low densities but retain high structural strength. Composite structures including lightweight honeycomb fillers contained within a thin shell could also be used. Where the invention is embodied as a large aircraft, conventional aircraft materials could be used, for example the ring-wing 11 could have a conventional structure of spars, struts and ribs. Whilst a profile that remains uniform around the ring-wing 11 is used in the above embodiment, the profile could vary around the ring-wing 11. For example, to gain extra lift, an exaggerated camber may be used on the top and bottom sections of the ring-wing 11, the camber being in the same sense for both parts. Clearly, the profile of the ring-wing 11 must vary between the top and bottom sections for the camber to be in the same sense.

Furthermore, rather than operating the aircraft 10 by remote control, the aircraft may be autonomous, employing an auto-pilot for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An aircraft comprising:
   a fuselage; and a propulsion unit; wherein
said fuselage is in the form of a ring-wing having a substantially circular cross-section defining a duct with a longitudinally-extending central axis, said propulsion unit being located within the duct and moveable aerofoils for controlling the aircraft in flight, the ring-wing fuselage being truncated obliquely at one end, such that a rear end of the aircraft, relative to a direction of horizontal flight, is truncated obliquely to form a ring-wing with opposed sides of unequal length, with a rear lower side extending beyond a rear upper side.

2. An aircraft according to claim 1, wherein the ring-wing fuselage is truncated by a planar slice through the ring-wing fuselage.

3. An aircraft according to claim 1, wherein the ring-wing fuselage is truncated by a curved slice, the angle made with the ring-wing fuselage being relatively shallow at the longer side of the ring-wing fuselage and relatively steep at the shorter side of the ring-wing fuselage.

4. An aircraft according to claim 1, wherein at least one of components and any payload are housed in a compartment that is external to the longer side of the ring-wing fuselage.

5. An aircraft according to claim 4, wherein the compartment is provided at an end of the ring-wing fuselage, that end being the front when in horizontal flight.

6. An aircraft to claim 1, wherein components and payload are housed in a compartment provided within the longer side of the ring-wing fuselage.

7. An aircraft according to claim 1, wherein:
at least one of said aerofoils is a pitch controlling aerofoil; and
the pitch controlling aerofoil is positioned to reside substantially flat with the lower side of the ring-wing fuselage when not deployed.

8. An aircraft according to claim 7, wherein the pitch-controlling aerofoil is provided as an element of the longer side of the ring-wing fuselage.

9. An aircraft according to claim 7, further comprising two orthogonal vanes, wherein one vane provides aerodynamic lift in the same as the pitch-controlling aerofoil.

10. An aircraft according to claim 1, which is unmanned.

11. An aircraft comprising:
a fuselage in the form of a ring-wing having a cross section defining a duct with a longitudinally extending central axis;
a propulsion unit located within the duct;
moveable air foils located within the duct for controlling the aircraft in flight; wherein
the ring-wing fuselage is truncated at a rearward end thereof relative to direction of air flow through said duct, forming opposed portions of said ring-wing fuselage which are of unequal length, such that when said aircraft is in horizontal flight, a lower portion of said ring-wing fuselage extends farther rearwardly than an upper portion thereof.

* * * * *